Jan. 22, 1935.  M. ROSENBERG  1,988,515
METHOD OF TREATING TOBACCO
Filed Sept. 26, 1934
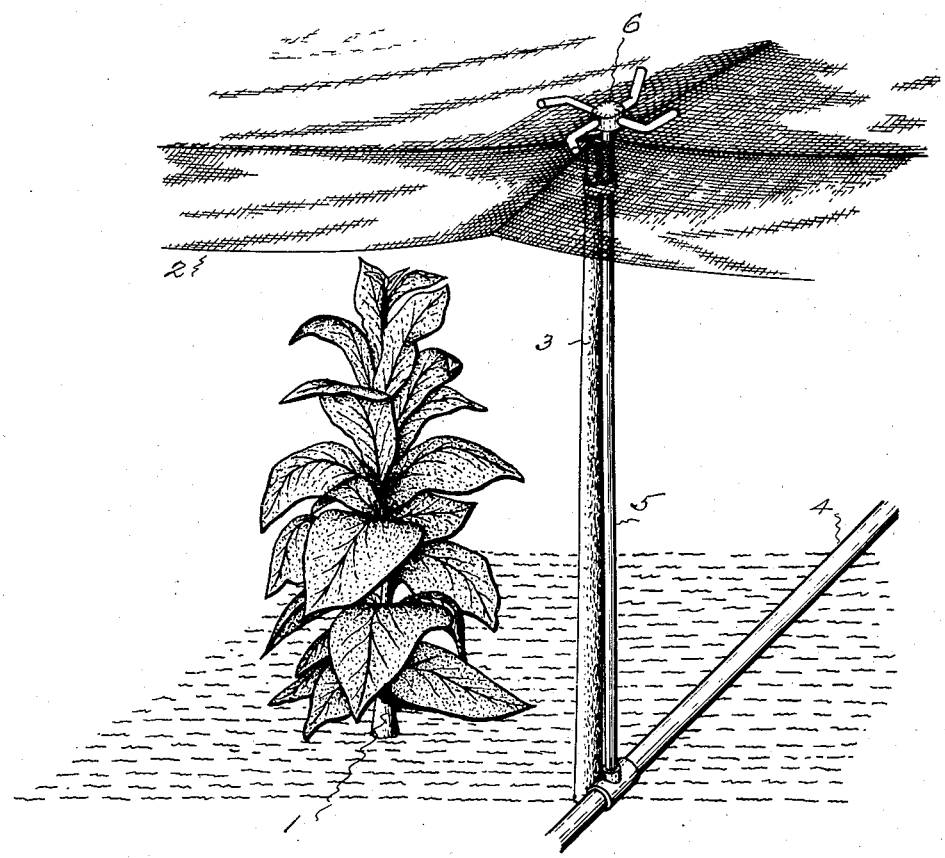
INVENTOR
May Rosenberg by
Harry P. Williams
atty.

Patented Jan. 22, 1935

1,988,515

UNITED STATES PATENT OFFICE 1,988,515

METHOD OF TREATING TOBACCO

May Rosenberg, West Hartford, Conn.

Application September 26, 1934, Serial No. 745,512

5 Claims. (Cl. 47—58)

This invention relates to a method of treating growing tobacco, especially shade grown, that is, tobacco which is grown under tents of open weave fabric and from the stalks of which the leaves are picked to be primarily used for cigar wrappers but may be used for other purposes. It is known that the middle leaves on the stalks of shade grown tobacco are the most valuable being lighter in color and of finer texture, and in the market on account of color and texture they bring much higher prices than the upper leaves which are darker and coarser. For this reason it is desirable to obtain as many light and fine leaves from each plant as is possible.

The object of this invention is to so treat tobacco growing under tents that the top leaves will be lighter in color and finer in texture than they would be if nature was allowed to take its course unaided.

I have discovered that this object may be attained by artificially producing an atmospheric condition about the top leaves that is similar to that condition which causes those lower to have the qualities mentioned.

The soil in which this tobacco is planted is fertilized, common fertilizer containing potash, ammonia salts and other ingredients. Evaporated moisture or the gas resulting from the action of the rays of the sun on this fertilized soil has an ammonia content which effects the leaves of the growing plant, particularly those nearer the soil. Consequently the present method is designed to develop a condition about the top leaves similar to that which exists about the lower leaves, that is, to subject the top leaves to the action of gases that will produce the desirable color and texture of the lower leaves that results from the gases rising from the fertilized soil.

In practice, after the actinism of the sun has diminished, as when the sun is low or after it has set, the tent over the tobacco to be treated is sprayed with a liquid, preferably a dilute solution of ammonia, which may or may not contain vegetable coloring matter.

The accompanying drawing illustrates a contemplated means for practicing the present method.

In the view 1 indicates the growing tobacco plant and 2 the tent covering which is an open weave fabric of the nature of cheese cloth, that is supported on poles 3 in the usual manner. Piping 4 is carried over the field from a source of the fluid to be sprayed, which fluid of course is under either gravity or mechanically produced pressure. At suitable intervals upright pipes 5 may lead from the ground piping up the side of poles to points above the tenting, and their upper end provided with spraying nozzles 6, which will distribute the liquid to be used over sections of the top of the tenting.

By this means a gaseous mist which has some at least of the natural stimulating attributes of the natural gaseous condition which contributes to the development of the lower leaves, is produced about the upper leaves although of course all of the leaves are more or less affected by the mist. The tent fabric breaks up the spray so that the liquid drops become dissipated into a mist which settles upon and about the upper leaves of the tobacco so there is no spotting of the leaves. The tent fabric absorbs some of the liquid and by slow evaporation continues to give off the gas so that the desired gaseous condition about the top leaves is prolonged.

The invention claimed is:—

1. The method of treating tent protected growing tobacco leaves which comprises spraying the tent above the plants and providing a stimulating gaseous mist about the top leaves.

2. The method of treating tent protected growing tobacco leaves which comprises spraying the tent above the plants with a liquid containing ammonia.

3. The method of treating growing tobacco plants which comprises covering the plant with an open mesh fabric and spraying the covering fabric with a liquid having an ammonia content.

4. The method of lightening the natural color and refining the natural texture of the top leaves of growing tobacco plants, which comprises, after the actinism of the sun has diminished, producing a gaseous mist containing ammonia about the top leaves.

5. The method of rendering the growing leaves of fertilized shade grown tobacco uniform in color and texture which consists in subjecting the leaves of the stalks to the action of a mist of liquid which has a content that is similar to a content of the fertilizer.

MAY ROSENBERG.